(12) United States Patent
Anderson et al.

(10) Patent No.: US 7,172,333 B2
(45) Date of Patent: Feb. 6, 2007

(54) INJECTION MOLDING SCREW

(75) Inventors: Glenn Anderson, Malvern, PA (US); Jingyi Xu, York, PA (US)

(73) Assignees: Southco, Inc., Concordville, PA (US); Trexel, Inc., Woburn, MA (US)

( * ) Notice: Subject to any disclaimer, the term of this patent is extended or adjusted under 35 U.S.C. 154(b) by 226 days.

(21) Appl. No.: 10/460,844

(22) Filed: Jun. 13, 2003

(65) Prior Publication Data

US 2004/0253335 A1  Dec. 16, 2004
US 2006/0013910 A9  Jan. 19, 2006

Related U.S. Application Data

(60) Continuation-in-part of application No. 09/942,147, filed on Aug. 29, 2001, now Pat. No. 6,579,910, which is a division of application No. 09/285,948, filed on Apr. 2, 1999, now Pat. No. 6,322,347.

(51) Int. Cl.
*B29C 45/52* (2006.01)

(52) U.S. Cl. .............................. 366/78; 366/81; 366/82; 366/90; 425/208; 425/563; 425/564

(58) Field of Classification Search ................. 366/78, 366/90, 81, 82; 425/146, 205, 207–209, 425/382.4, 562, 563, 564
See application file for complete search history.

(56) References Cited

U.S. PATENT DOCUMENTS

| | | | | |
|---|---|---|---|---|
| 3,501,810 A | * | 3/1970 | Powell | 425/146 |
| 3,889,930 A | * | 6/1975 | Brandis et al. | 366/82 |
| 3,936,038 A | * | 2/1976 | Olmsted | 366/77 |
| 4,377,180 A | * | 3/1983 | Biljes | 137/528 |
| 4,749,279 A | * | 6/1988 | Csongor | 366/80 |
| 5,145,694 A | * | 9/1992 | Brams | 425/174.8 R |
| 5,164,207 A | * | 11/1992 | Durina | 425/382.4 |
| 5,441,400 A | * | 8/1995 | Zeiger | 425/562 |
| 6,169,122 B1 | | 1/2001 | Blizard et al. | |
| 6,284,810 B1 | | 9/2001 | Burnham et al. | |
| 6,322,347 B1 | | 11/2001 | Xu | |
| 6,579,910 B2 | | 6/2003 | Xu | |
| 6,593,384 B2 | | 7/2003 | Anderson et al. | |
| 6,602,063 B1 | | 8/2003 | Cardona | |
| 2001/0018121 A1 | | 8/2001 | Okamoto et al. | |
| 2001/0033040 A1 | | 10/2001 | Cardona et al. | |
| 2002/0024165 A1 | | 2/2002 | Xu | |
| 2002/0147244 A1 | | 10/2002 | Kishbaugh et al. | |
| 2002/0147245 A1 | | 10/2002 | Kim et al. | |
| 2003/0049350 A1 | * | 3/2003 | Gill et al. | 425/564 |
| 2005/0009936 A1 | * | 1/2005 | Xu | 521/79 |

FOREIGN PATENT DOCUMENTS

| | | |
|---|---|---|
| WO | WO 98/08667 | 3/1998 |
| WO | WO 98/31521 | 7/1998 |
| WO | WO 02/14044 | 2/2002 |
| WO | WO 02/34491 | 5/2002 |
| WO | WO 02/072927 | 9/2002 |
| WO | WO 02/090085 | 11/2002 |

* cited by examiner

*Primary Examiner*—David Sorkin
(74) *Attorney, Agent, or Firm*—Paul & Paul

(57) ABSTRACT

An injection molding screw for metal injection molding includes a first end, a second end, a longitudinal body with a first stage and a second stage extending axially along a length of the screw between the ends, a pressure retention device, and optionally, a screw tip. The pressure retention element minimizes loss of pressure in the second stage portion.

41 Claims, 11 Drawing Sheets

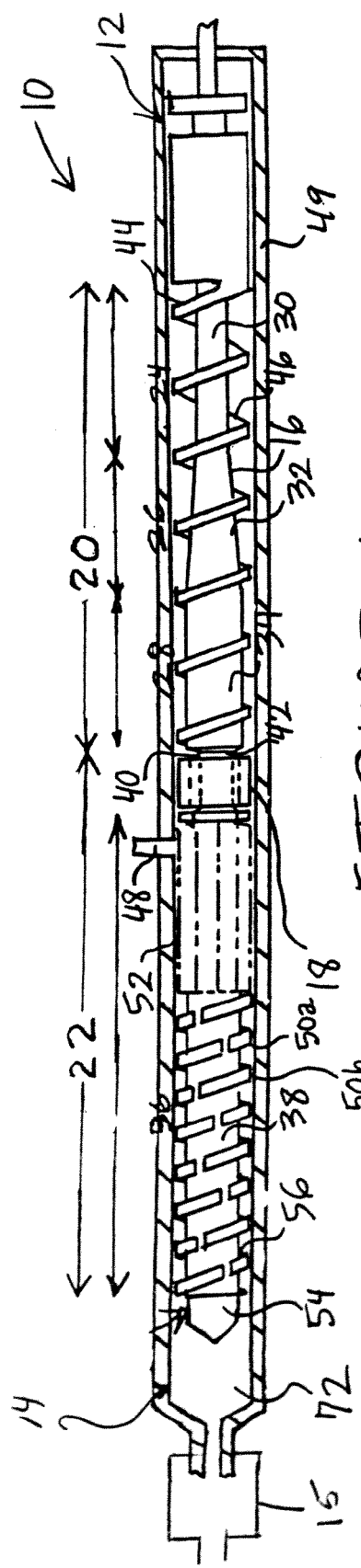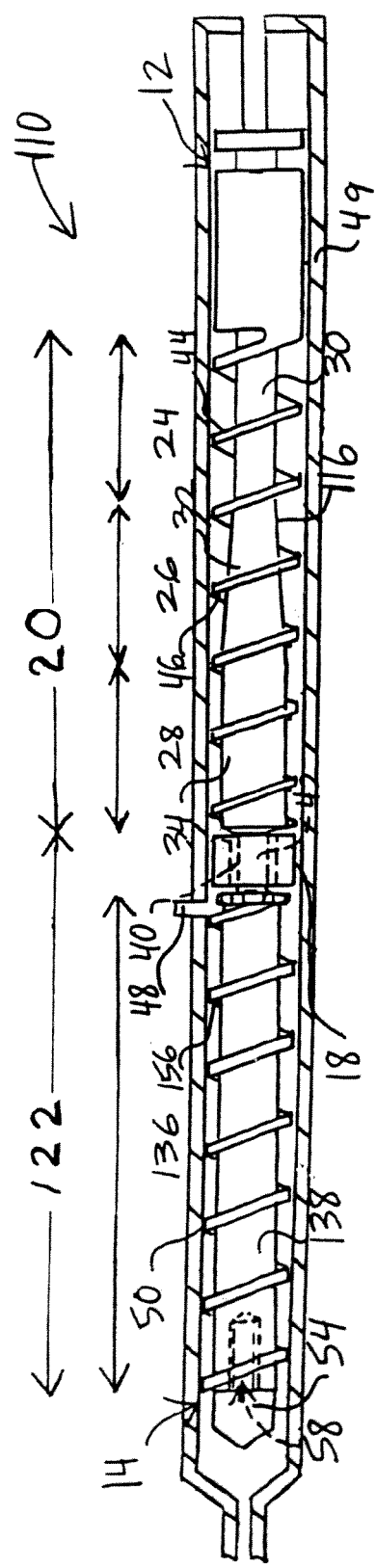

PRIOR ART

INJECTION MOLDING SCREW

This application is a continuation-in-part of U.S. patent application Ser. No. 09/942,147, filed Aug. 29, 2001, now U.S. Pat. No. 6,579,910, which was a division of U.S. patent application Ser. No. 09/285,948, filed Apr. 2, 1999, now U.S. Pat. No. 6,322,347.

BACKGROUND OF THE INVENTION

1. Field of the Invention

The present invention relates generally to extrusion screws. More specifically, the present invention relates to injection molding screws.

2. Description of the Related Art

Extrusion screws and extrusion devices or systems are known in the art.

A known Trexel, Inc.-designed injection molding screw used in the MuCell® process for polymer materials is not an optimal design for processing metal or ceramic feedstock materials and the like. This screw has four distinct sections.

The first section, starting from the drive or hopper end, includes a feed section, a transition section, and a metering section.

The second section, also referred to as a restriction element, has an increased minor diameter, and is located between the conventional screw flights and the first mixing section of the standard screw for the microcellular process. The second section restricts the back flow of molten material upstream of the gas port location. This feature is for melt pressure retention when the high-pressure gas is added to the molten material in the barrel.

The third section is a reverse channel flow mixing section, based on a Union Carbide or Maddock mixing design, which is commercially available from industry injection molding machine screw suppliers. This section coincides with the gas port orifice for the introduction of super critical fluid (SCF) or blowing agent, such as nitrogen, carbon dioxide, and other atmospheric gases, into the molten material. The flow of material through this section exposes a large area of molten material to accept the SCF or blowing agent to promote uniform distribution and dispersion into the molten material.

The fourth section is a close pitch, dual flight mixing section. The flights have unequal height and are segmented to promote the cross flow of molten material between the flights of this mixing section.

This known standard screw for the microcellular process for polymer materials has design limitations when processing metal or ceramic feedstock materials and the like.

SUMMARY OF THE INVENTION

The present invention is directed to an injection molding screw comprising a first end adapted for engagement with drive means, a second end adapted for engagement with a screw tip, a longitudinal body extending axially along a length of the screw between the ends, and a pressure retention element. The screw may further comprise a screw tip.

The body comprises a first stage portion and a second stage portion. The first stage portion is adapted for first receiving at least one substance and for transporting the substance to the second stage portion. The first stage portion includes at least one flight extending helically along the first stage portion. The flight of the first stage portion forms at least one channel through which the substance is transported along the first stage portion to the second stage portion in a downstream direction. The second stage portion includes at least one mixing section, and at least one flight extending helically along some portion of the second stage portion. The second stage portion is adapted for transporting the substance transported from the first stage portion to the screw tip. At least one gas injection port, located on a portion of a barrel downstream from the first stage portion, introduces at least one fluid to the substance transported from the first stage portion. The mixing section is adapted for mixing the substance transported from the first stage portion and for transporting the substance that has been mixed to the screw tip for extrusion. The flight of the second stage portion forms at least one channel through which the substance is transported along the second stage portion to the screw tip. The second stage incorporates a means to induce shear and distributive mixing of the fluid in the substance, such as feedstock materials.

The pressure retention element is adapted for being positioned about an intermediate section between the first stage portion and the second stage portion. The pressure retention element provides means to reduce, and preferably minimize, loss of pressure in the second stage portion.

BRIEF DESCRIPTION OF THE DRAWINGS

FIG. 1 is a side elevational view of a first embodiment of an injection molding screw according to the present invention.

FIG. 2 is a side elevational view of a second embodiment of an injection molding screw according to the present invention.

DETAILED DESCRIPTION

Figure 3:
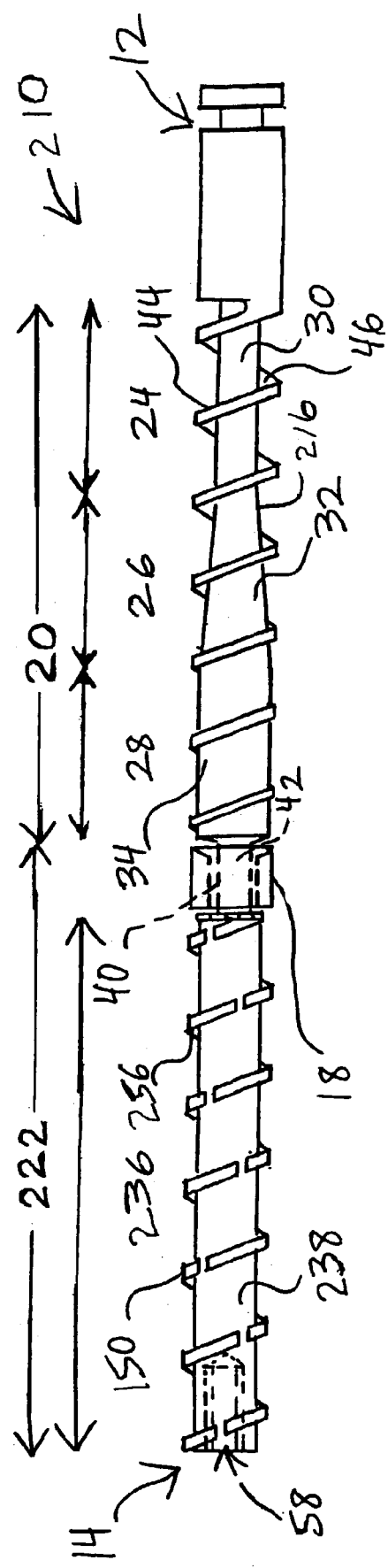
FIG. 3 is a side elevational view of a third embodiment of an injection molding screw according to the present invention.

A number of problems have been encountered when attempting to use the above-described standard screw for the microcellular process for polymer materials when processing metal or ceramic feedstock materials and the like.

The screw clearance specification for polymer screws provided by the Society of Plastics Industry, which sets standards for molding equipment, is too small for processing metal injection molding ("MIM") materials. The standard screw for the MuCell process has a screw-to-barrel clearance for polymer processing of 0.002 inch. The MIM industry screw clearance recommendation is two times that for polymer screws. The small clearance caused galling and wear of the screw, screw tip and barrel components on the molding machine. The size of some metal particles exceeds the clearance between the screw and barrel. The pre-mature wear of the screw outside diameter degrades the process performance by enabling back flow of material over the screw flights, reducing its pumping capability and retention of the minimum pressure to keep the SCF or blowing agent in solution of the molten material. The increased minor diameter of the second section of the screw does not restrict the pressure well enough to control the minimum melt pressure required to obtain a stable process condition when processing metal feedstock materials. The feedstock binder ingredients and percentages are key to control the pressure decay with this screw.

Replacing this design feature with a mechanical check valve would reduce or eliminate the pressure decay when processing metal or ceramic feed stock materials. However, mechanical check valves are not typically used on injection molding screws smaller than 45 mm in diameter because of the lower mechanical strength of the design where the check valve is located. On the other hand, these check valves may still be successfully used on injection molding screws having smaller diameters. The mixing sections of the standard screw are too restrictive and introduce too much kinetic and shear energy into the molten feedstock materials. The mixing section designs are for aggressive mixing of the molten polymer material to aid in the distribution and dispersion of the SCF or blowing agent.

Metal and ceramic feedstocks incorporate a high percentage of solid particles to binder (about 60% particles to 40% binder), which are susceptible to separation when exposed to too high of kinetic and shear energy. These mixing sections cause the powder particles to separate from the binder resulting in powder particle packing in low flow areas of the mixing sections of the screw, eventually blocking material flow through the barrel. Replacing these mixing sections with less restrictive, free flowing designs would improve the process performance of the metal or ceramic feedstock material.

Aggressive mixing section designs are not required when processing metal or ceramic feedstock material because the metal or ceramic particles act as nucleating agents. The nucleating agents promote the dispersion and diffusion of the SCF or blowing agent into the binder material. This is more evident with the large ratio of solid particles to binder in these types of materials. Essentially, there is 60% less polymer based binder to disperse and diffuse the SCF or blowing agent for which the dynamic movement, from shear, of the particles aid in the dispersion of the gas.

The compression ratio of the standard screw for the MuCell process is too high when compared to MIM or PIM (powder injection molding) processing requirements. The standard screw for the MuCell process has a 2.6 to 1 compression ratio where the MIM or PIM industry standard is 1.5 to 1 up to 1.7 to 1 compression ratio. The compression ratio is the decrease in volume between the feed section and the metering section of the screw with a constant pitch screw flight. The higher compression ratio can also promote powder binder separation.

Figure 7:
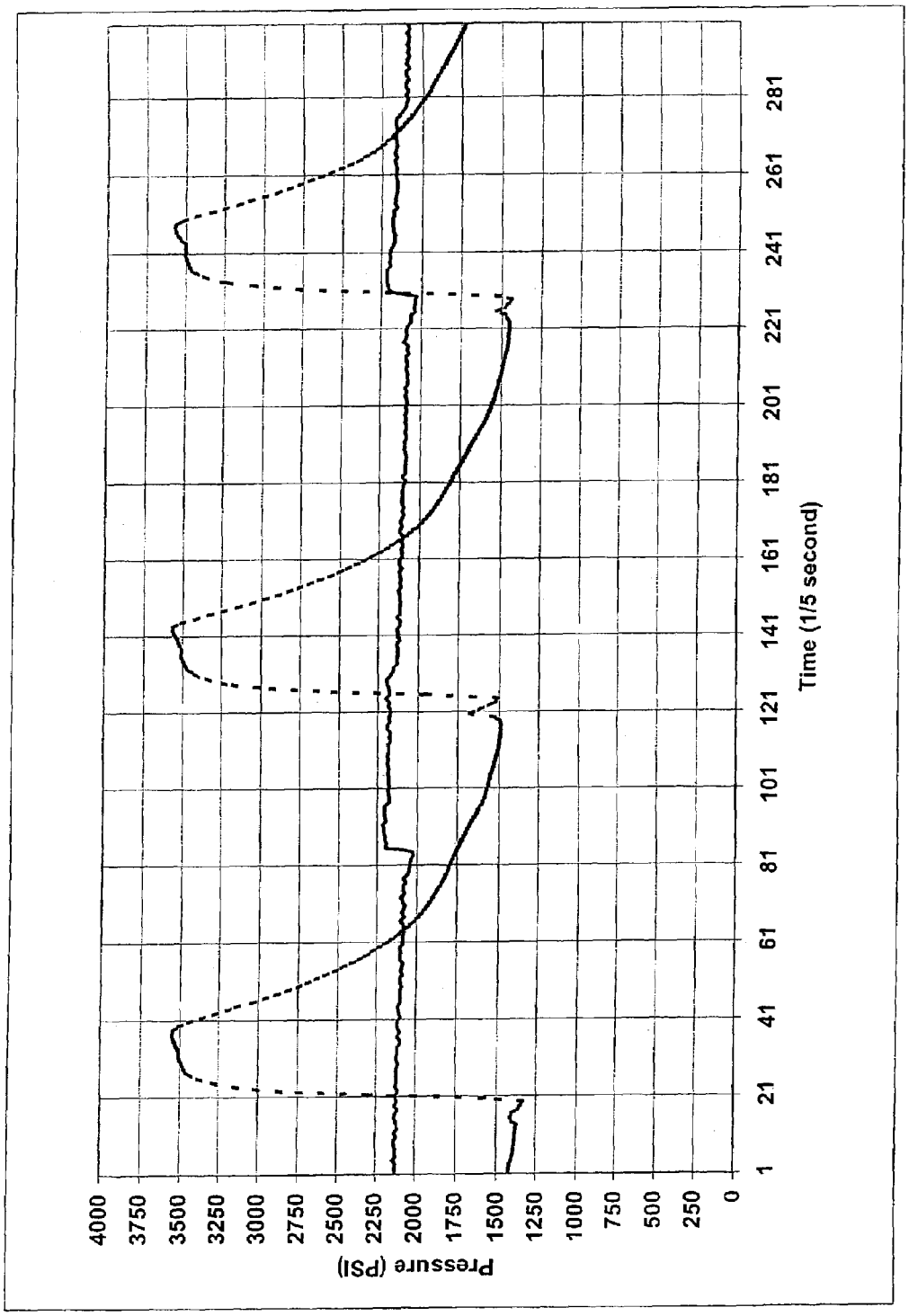
FIGS. 7–10 are graphs showing the results derived from a check valve of the injection molding screw according to the present invention to control pressure change in the molding process.

As can be seen in FIG. 7, the melt pressure decay in the barrel is greater with MIM feedstocks than the melt pressure decay when processing polymers using the MuCell process with the standard screw. The high content of filler (metal particles) in the binder, and the material(s) in the binder of MIM feedstock makes these materials sensitive to viscosity and melt pressure changes. The addition of the SCF gas into the molten binder lowers its viscosity. A benefit of the lower viscosity of the molten feedstock is the lower injection pressured required to fill the mold cavity. A drawback is the lower material viscosity, along with the material pressure in this section, amplifies the pressure decay in the standard screw for the MuCell process. The higher compression ratio increases the shear heating during screw rotation, lowering the viscosity of the molten MIM material. This in conjunction with flow of the molten material promotes the separation of the powder from the binder, an undesirable effect.

The pressure decay in the barrel during a molding cycle, with the standard screw for the MuCell process, was significant with all materials when gas is added to a polymer or feedstock material. The pressure decay in the process can be greater than 1500 PSI (FIG. 7). Maintaining the polymer or feedstock melt pressure in the barrel to keep the SCF gas in solution is critical to the formation of micro-cellular structure. The critical pressure for Nitrogen gas is approximately 500 PSI and carbon dioxide gas is 1080 PSI. The solubility of the SCF gas into the polymer or feedstock is a function of the temperature and pressure of the molten material's physical properties at the process conditions. Some materials were difficult to obtain a stable process condition because of not having a uniform pressure drop of the melt pressure in the barrel. This may be attributed to the additional work through shear heating, which lowers the molten material viscosity during the plastication cycle. This can be a combination of maintaining too high of polymer or feedstock melt pressure to compensate for the pressure decay, and/or too fast of a screw rotation speed. The process melt pressures must be maintained above the critical pressure of the SCF gas to keep it in solution in the molten material. In addition, the shear heating effects are greater at higher pressure and can make achieving a stable process condition of shear sensitive polymers or feedstock very difficult, or impossible.

Figure 4:
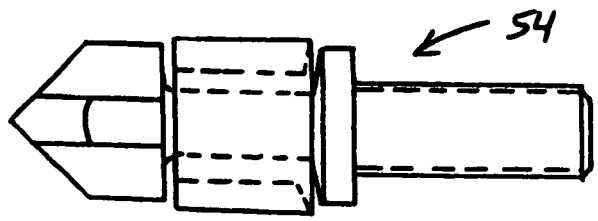
FIG. 4 is a cross-sectional view of a standard 3-piece check ring screw tip.

The MIM feedstocks are pressure and shear sensitive because of the material which comprises the binder, with a potential of powder and binder separation or powder packing into stagnant regions. MIM feedstock was processed with the standard screw for the MuCell process having a conventional sliding check ring screw tip (FIG. 4). Microporous structure in the MIM feedstock was produced from several materials. The process, however, was not repeatable nor consistent. Material flow obstructions from powder binder separation that caused metal particle packing in low flow areas were encountered. In addition, it was difficult to control the feedstock melt pressure to obtain the desired SCF gas content into the material in the barrel. This led to having excess or insufficient SCF gas in the MIM material in the barrel. The pressure decay was significant with the MIM material and it was difficult to maintain a minimum pressure in the system (FIG. 7).

The processing of MIM feedstocks via the MuCell process in injection molding and for microporous metal requires a different screw design because of the high proportion of solid particles in it and the material that comprises the binder (e.g. polymer or polymer and wax). The thermal conductivity of the metallic powder is also a factor in the screw design. The compression ratio directly relates to the amount of shear heating of the material during the screw rotation. The metal particles conduct and retain heat from the shear heating, thus requiring less compression and barrel heating to melt and convey the MIM feedstocks. The metal powder can separate from the binder if too much shear force (too much compression in the first stage portion) is introduced into the melted feedstock material. Another effect of excessive shear is the lowering of the melt viscosity, which facilitates powder/binder separation. The mass of the metallic particles forces the binder to lag behind the particle when accelerated by the shear force during the rotation of the screw. The screw rotation rate can be adjusted on the molding machine to control the shear rate, the backpressure, and the melt pressure. As a result of movement and viscosity reduction in the binder phase, the powder particles tend to pack in stagnant flow regions, potentially causing obstruction(s) in the screw or the screw tip. With the standard screw for the MuCell process, the second stage portion is too restrictive, which causes powder/binder separation leading to powder blockages, and induced too much shear heating.

The higher back pressure and melt pressure required for the MuCell process along with the lower viscosity of the MIM feedstock melt with dissolved SCF gas can cause powder/binder separation and packing of the material around the area of the conventional pressure-activated check valve type screw tip (FIG. 4). This causes the free-floating, sliding ring check valve to remain open or stuck close during injection using the MIM feedstock. This delay causes inconsistent shot size due to the back flow of material through the open check valve. The back flow of molten material is related to the injection pressure, which is 4 to 5 times higher than the melt pressure in the barrel. The molten material back flow occurs when injection pressure is introduced into the molten material upstream of the screw tip check valve, prior to closure of the check valve. The injection pressure in this restrictive flow mixing section of the standard screw for the MuCell process causes the MIM feedstock material to either pack and obstruct the melt flow path on the screw, or cause the high-pressure safety relief disk to rupture. This safety relief disk is located adjacent to the gas delivery orifice in the barrel, which is located downstream from the middle check valve on the screw. In addition, the packed material can cause adhesive wear on the screw tip components leading to a premature failure of these components in the screw tip (FIG. 4).

The standard screw for the MuCell process also includes a melt flow control device located upstream of the gas injection port preventing or restricting the gas at high pressure to escape to ambient pressure at the barrel orifice. The melt flow control device, or restriction element, consists of an increase in the minor diameter of the screw for a short length, reducing the annular clearance of the minor diameter of the screw to the inside diameter of the barrel. This utilizes the viscosity of the molten polymer and the melt flow through this annulus to control the pressure differential downstream and upstream to atmospheric pressure. The limitation of this design is that the ability to control the melt pressure is a function of the melt viscosity. This adds an element that makes the MuCell molding machine process difficult to control with this screw design. The large pressure decay can cause coalescing of the gas, the formation of large gas pockets in the barrel. This is an undesirable event that directly affects the control and outcome of the process in the molded polymer part.

The injection molding screw of the present invention may be applicable to some conventionally designed extruder screws including single flight screws, such as one, two and three section screws, and multi-flight screws, such as double flight screws. Additionally, the injection molding screw of the present invention may be utilized to improve the performance of the process and quality of products for injection molding of metal or ceramic feedstock materials, and the like.

Referring now to the drawings in detail, wherein the same reference numerals are used consistently to refer to the corresponding structural element throughout the appended drawings, in FIGS. 1–6 and 11–12, is illustrated an injection molding screw 10, 110, 210 in accordance with several embodiments of the present invention.

The injection molding screw 10, 110, 210 of the present invention includes a drive end 12, a screw tip receiving end 14, a generally cylindrical longitudinal body 16, 116, 216 extending axially along the length of the screw 10, 110, 210 between the drive end 12 and screw tip receiving end 14, and a pressure retention element 18, preferably a ring check valve. The screw 10, 110, 210 may further include a screw tip 54. The direction of fluid flow is shown by the arrow 33 in FIGS. 1–3 and 11–12.

As illustrated in FIGS. 1–3, the longitudinal body 16, 116, 216 comprises a first stage portion 20 and a second stage portion 22, 122, 222. The first stage portion 20 of the screw is substantially the same in all three embodiments, while the second stage portion 22, 122, 222 differs in all three embodiments.

The first stage portion 20 is adapted for first receiving at least one substance (not shown), such as metal feedstock materials, ceramic feedstock materials, and the like, and for transporting the at least one substance to the second stage portion 22, 122, 222 in a downstream direction. The first stage portion 20 is divided into multiple sections, or zones, and comprises a feed section 24, a transition section 26, and a metering section 28. The feed section 24 is located most proximate to the drive end 12. The transition section 26 is located intermediate the feed section 24 and the metering section 28. Each of the feed section 24, transition section 26, and metering section 28 has a minor diameter 30, 32, 34, respectively. The minor diameter 34 of the metering section 28 is greater than the minor diameter 32 of the transition section 26, while the minor diameter 32 of the transition section 26 is greater than the minor diameter 30 of the feed section 24. The minor diameter 34 of the metering section 28 is approximately the same as the minor diameter 38, 138, 238 of the mixing section 36, 136, 236 of the second stage portion 22, 122, 222. The minor diameter 42 of the intermediate section 40 is less than the minor diameter 34 of the metering section 28 and minor diameter 38, 138, 238 of the mixing section 36, 136, 236. The minor diameters 30, 32, 34, 38, 138, 238, 42 aid in distributive mixing and uniform shear heating.

The first stage portion 20 includes a single flight 44 extending helically along the first stage portion 20. The single flight 44 forms a channel 46 by which the substance is transported along the first stage portion 20 to the second stage portion 22, 122, 222. The single flight 44 has a constant height and constant pitch. However, screw flights having varying pitches or number of flights may be utilized in the practice of the present invention. Further, the minor diameters of these sections may be concentric, eccentric, or a combination of both (example: barrier flights or dual flight or pitch).

As illustrated in FIG. 1, the second stage portion 22 of the first embodiment includes a mixing section 36, a mixing flight 50a, 50b extending helically along the mixing section 36, and a helical vane mixing section 52 located between the mixing section 36 and the intermediate section 40. The second stage portion 22 is adapted for transporting the substance transported from the first stage portion 20 to the screw tip 54 in a downstream direction.

At least one gas injection port 48, located on a portion of a barrel 49 downstream from the first stage portion 20, introduces at least one fluid, super critical fluid (SCF), or blowing agent (not shown), such as nitrogen, carbon dioxide, other atmospheric gases, hydrocarbons, chlorofluorocarbons, and the like, to the substance transported from the first stage portion 20. The gas injection port 48 and its effective positioning, when the invention is in use, preferably along a portion of the barrel 49 corresponding to the second stage portion 22, are well known in the art. The gas injection port 48 can be positioned in a variety of effective positions, as known in the art.

The helical vane mixing section 52 begins the mixing process of the SCF or blowing agent and the substance transported from the first stage portion 20, and transports the substance to the mixing section 36. The mixing section 36 completes the mixing process, and transports the mixed substance to the screw tip 54 for injection into the mold and/or extrusion.

The mixing flight 50a, 50b traverses a substantial portion of the length of the mixing section 36, and forms at least one channel 56 by which the mixed substance is transported along the second stage portion 22 to the screw tip 54. The mixing flight 50a, 50b is a serrated double (or dual) mixing flight with a pitch of one-half. The flights 50a, 50b of this serrated double mixing flight type are of unequal height, and are serrated to promote the cross flow of the substance between the flights 50a, 50b during the mixing process. This can be accomplished with other geometries such as single flight or multiple flight mixing geometry with or without serrations or other geometry is typical of mixing sections used for plastizing screws. Thus, the mixing section 36 causes serrated mixing of the substance along the mixing section 36.

As illustrated in FIGS. 1–3 and 11–12, the pressure retention element 18, such as a ring check valve, of the present invention is preferably positioned at or about the intermediate section 40 between the first stage portion 20 and second stage portion 22, 122, 222 and downstream of the metering section 28 of the screw 10, 110, 210. When in use, the ring check valve 18 is preferably positioned upstream of the location of the gas injection port 48 on the barrel 49. The ring check valve 18 includes a ring 60 (FIGS. 11 and 12) that extends around the diameter 42 of a small section, referred to as the intermediate section 40 in the present invention, of the screw 10, 110, 210 and is laterally moveable between a first position, allowing the flow of material therethrough, and a second position, preventing the flow of material therethrough. The outer diameter 62 of the ring 60 is sized to substantially prevent the flow of the substance, or mixture of the substance and SCF or blowing agent, between the ring 60 and the barrel 49, while still allowing the ring 60 to move laterally.

Figure 11:
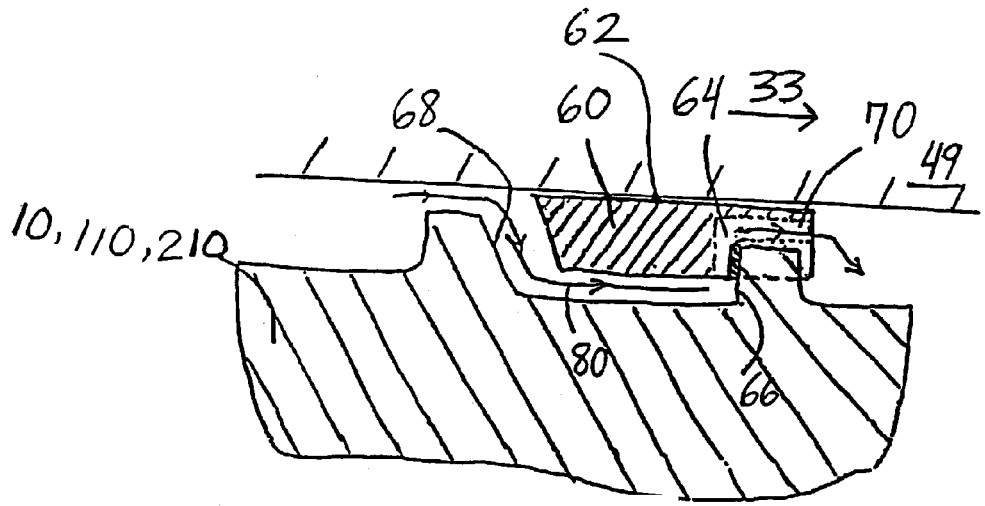
FIG. 11 illustrates a section of a present restriction element permitting the flow of material in a downstream direction in any of the injection molding screws of FIGS. 1–3.

In the first position, as illustrated in FIG. 11, an internal ledge 64 of the ring 60 contacts a blocking surface 66 that extends from the body 16, 116, 216 of the screw 10, 110, 210. The ring 60 is disengaged from a sealing surface 68 of the screw 10, 110, 210 to provide a space therebetween through which the substance, or mixture of the substance and SCF or blowing agent, can flow in a downstream direction following path 80. In this position, the substance, or mixture of the substance and SCF or blowing agent, flows through an internal passageway 70 in the ring 60 to pass downstream of the pressure restriction element 18.

Figure 12:
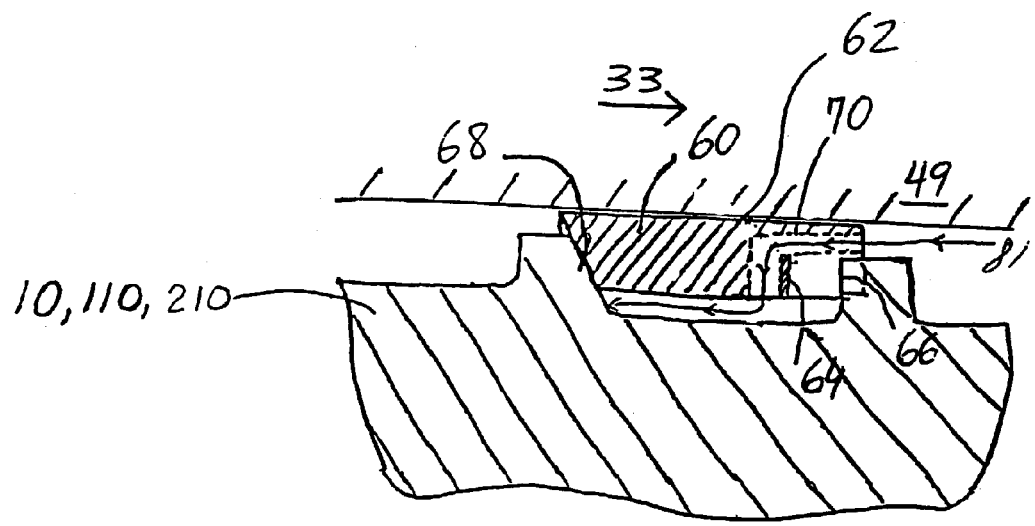
FIG. 12 illustrates a section of a present restriction element preventing the flow of material in an upstream direction in any of the injection molding screws of FIGS. 1–3.

In the second position, as illustrated in FIG. 12, the ring 60 is displaced in an upstream direction and is engaged with the sealing surface 68 of the screw 10, 110, 210 to provide a restriction to upstream flow of the substance, or mixture of the substance and SCF or blowing agent as shown by path 81. In some preferred embodiments, the engagement between the ring 60 and sealing surface 68 substantially prevents the upstream flow of the substance, or mixture of the substance and SCF or blowing agent, therebetween. In other cases, the ring 60 and sealing surface 68 are constructed to allow a small amount of upstream flow, when engaged (e.g. via channels between the ring 60 and sealing surface 68 that exist when the ring 60 is in the second position). The sealing surface 68 and the surface of the ring 60 may be tapered, as illustrated, to provide a tight seal particularly when the prevention of upstream flow is desired.

The relative position of the ring 60 depends upon the forces acting upon it. In particular, the ring's position depends upon the difference in the pressure of the substance, or mixture of the substance and SCF or blowing agent, upstream of the ring 60 and the pressure of the substance, or mixture of the substance and SCF or blowing agent, downstream of the ring 60. In preferred embodiments, the ring 60 is designed to be in the first position when the upstream pressure is greater than downstream pressure and to move to the second position when the downstream pressure is greater than the upstream pressure.

In typical operation, at the beginning of the injection or ejection cycle the ring 60 is generally disengaged from the sealing surface 68 (FIG. 11), because the pressure of the molten substance, or molten mixture of the substance and SCF or blowing agent, upstream of the ring 60 is greater than the downstream pressure, thus permitting the substance, or mixture of the substance and SCF or blowing agent, to be conveyed in a downstream direction past the pressure restriction element 18 and to accumulate in region 72. When a sufficient charge of the mixture of the substance and SCF or blowing agent has been accumulated in region 72, the screw 10, 110, 210 moves in a downstream direction from the accumulation position (FIG. 1) to an injection or ejection position (FIG. 2) to extrude the accumulated material. The downstream motion of the screw 10, 110, 210 compresses the accumulated charge, thereby elevating its pressure. This creates a high pressure condition on the downstream side of the ring 60 relative to the upstream side, which causes the ring 60 to move to the second position to engage the sealing surface 68 (FIG. 12) thereby restricting the flow of material and maintaining the pressure downstream of the pressure restriction element 18. Typically, the ring 60 remains in the second position until the pressure upstream of the pressure restriction element 18 exceeds the downstream pressure, at which point the ring 60 returns to the first position.

The ring check valve 18 provides means to at least minimize loss or decay of pressure in the second stage portion 22, 122, 222 (FIG. 7) in the barrel 49 of a processing system (not shown; well known in the art), such as a molding machine or system, when using MIM or ceramic feedstocks with the standard microcellular screw. The pressure decay can cause coalescing of the gas, the formation of large gas pockets in the barrel 49. The control of melt and back pressure in the barrel 49 throughout the process cycle, and sufficient mixing of the material after the addition of the SCF or blowing agent, are key criteria to enable the production of microporous MIM. Referring to FIG. 7, the ring check valve 18 enables a larger process window of back and melt pressures when processing metal feed stock materials. The ring check valve 18 may be free floating or captive by the screw 10, 110, 210 with respect to moving in rotation with the screw 10, 110, 210. The constrained or captive ring check valve 18 prevents galling or premature wear of the check valve components or wear on the mating surfaces of the screw 10, 110, 210. Screw and component wear is an important criterion when processing MIM feedstocks, due to the abrasive nature of this material. Material selection for the screw 10, 110, 210, screw components, and barrel 49 is important for durability of both the screw and check valve components for the MIM and ceramic feedstocks. The clearances of the screw 10, 110, 210 and ring check valve 18 are the same as those required for the screws and screw tip components for processing MIM feedstock without gas injection. The ring check valve 18 may be of one piece with a two-piece screw fastened with a threaded or pinned connection, or of two pieces with a one-piece screw. The two-piece check valve may be screwed, pinned, press fit, loose fit (held in place by the screw's geometry and the inner diameter of the barrel) and/or welded together. Other types or methods of check valves can alternatively be used.

The fixed ring check valve 18 is one example of a pressure restriction element employed in extruders (not shown; well known in the art) constructed and arranged to maintain a solution of the substance, such as feedstocks or polymers, and SCF or blowing agent within a processing space between a blowing agent inlet (not shown; well known in the art) and an extruder outlet (not shown), such as a die, entrance into a mold, or other outlet, at a relatively high pressure through an injection or ejection cycle. Extruders constructed and arranged to maintain a pressure in this way are well known in the art, and examples are given herein that are not intended to limit the scope of the invention. The pressure restriction element 18 can take any of a variety of forms known in the art for restricting the upstream flow of the substance, such as a blister, a dam across the feed section of the screw, a reverse screw flight, or a valve.

The pressure restriction element 18 maintains the pressure of the mixture of the substance and SCF or blowing agent downstream of the pressure restriction element 18 above a minimum pressure throughout the cycle. In many cases, the pressure restriction element 18 maintains a pressure downstream of the pressure restriction element 18 throughout the cycle, of at least 1000 psi, in some cases at least 2000 psi, and in some cases at least 3000 psi. In preferred embodiments, the pressure downstream of the pressure restriction element throughout the cycle is maintained greater than the critical pressure required for a single-phase solution of the mixture of the substance and SCF or blowing agent for a given set of operating conditions. The critical pressure depends upon the weight percentage of SCF or blowing agent dissolved in the substance, and other operating conditions such as temperature. By maintaining the substance and SCF or blowing agent single-phase solution at a pressure above the critical pressure, the pressure restriction element 18 insures that the SCF or blowing agent will not prematurely come but of solution within the extruder, prior to a nucleation step, due to a pressure drop resulting from the upstream flow of the mixture of the substance and SCF or blowing agent during injection or ejection.

In some preferred embodiments that utilize a ring check valve 18, a non-negligible time period exists as the ring 60 moves from the first position to the second position. During this time period, the ring check valve 18 permits limited upstream flow of material therethrough prior to engaging with the sealing surface 68, which can be advantageous in lowering the high-pressure condition downstream of the pressure restriction element 18. This limited upstream flow prevents an unsafe, high-pressure condition (e.g. a pressure condition greater than operating pressures of the extruder), which could result if the pressure restriction element 18 eliminated all upstream flow of material past the pressure restriction element 18. The amount of pressure relief depends upon the extent of this time period, which is a function of the viscosity of the molten material, the ring design, and the injection speed, and can be adjusted appropriately by those of ordinary skill in the art.

To make the process more consistent, a safety element and shot size control element is preferably provided. The screw tip 54 is preferably an automatic closure valve type screw tip 54. Exposed and internal spring automatic closure valve type screw tips are commercially available in the injection molding industry. An example of the automatic closure valve type screw tip 54 is the automatic shut-off valve (FIG. 6) disclosed in U.S. Pat. No. 5,164,207, issued to Michael Durina on Nov. 17, 1992 and assigned to Spirex Corporation, incorporated herein by reference. This automatic shut-off valve fits the microporous MIM process and the requirements of the screw 10, 110, 210 because the MIM powder tends to cause adhesive wear and galling of the mating or interfacing components in the screw tip and the barrel surface. This screw tip design has design features that make this compatible with processing MIM feedstock, primarily the internal spring and the poppet valve design. The screw tip outside diameter was reduced to increase the clearances required for processing MIM feedstock. Another example of the automatic closure valve type screw tip 54 is the spring-biased check valve (FIG. 5) disclosed in U.S. Pat. No. 5,441,400, issued to Donald Zeiger on Aug. 15, 1995, incorporated herein by reference. In addition, a standard 3-piece check ring screw tip (FIG. 4) could also be used. The automatic closure screw tip 54 is mandatory to control the pressure in the second stage portion 22, 122, 222 of the screw 10, 110, 210 for safety and improved control when processing MIM feedstocks. These types of screw tips 54 may be threaded into the screw tip channel 58 at the screw tip-receiving end 14 of the screw 10, 110, 210. However, other types of screw tips may be attached or engaged to the screw 10, 110, 210, and the screw tip may be attached to the screw tip channel 58 by other types of means or methods.

As illustrated in FIG. 2, the second stage portion 122 of the second embodiment of the present invention includes a mixing section 136, and a mixing flight 50 extending helically along the second stage portion 122. The second stage portion 122 is adapted for transporting the substance transported from the first stage portion 20 to the screw tip 54 in the downstream direction. The gas injection port 48 and its effective positioning, when the invention is in use, preferably along a portion of the barrel 49 corresponding to the second stage portion 122, are well known in the art. The gas injection port 48 can be positioned in a variety of effective positions, as is known in the art. The mixing section 136 mixes the SCF or blowing agent and the substance transported from the first stage portion 20, and transports the mixed substance to the screw tip 54 for extrusion. The mixing flight 50 traverses a substantial portion of the length of the second stage portion 122, and forms a channel 156 by which the mixed substance is transported along the second stage portion 122 to the screw tip 54. The mixing flight 50 is a single mixing flight 50 with a constant pitch and constant height. Thus, the mixing section 136 causes conveying with friction flow mixing of the substance such that constant volume flow of the mixed substance is extruded from the screw tip 54.

As illustrated in FIG. 3, the second stage portion 222 of the third embodiment includes a mixing section 236, and a mixing flight 150 extending helically along the second stage portion 222. The second stage portion 222 is adapted for transporting the substance transported from the first stage portion 20 to the screw tip 54 in the downstream direction.

The gas injection port 48 and its effective positioning, when the invention is in use, preferably along a portion of the barrel 49 corresponding to the second stage portion 222, are well known in the art. The gas injection port 48 can be positioned in a variety of effective positions, as is known in the art. The mixing section 236 mixes the SCF or blowing agent and the substance transported from the first stage portion 20, and transports the substance that has been mixed to the screw tip 54 for extrusion. The mixing flight 150 traverses a substantial portion of the length of the mixing section 236, and forms at least one channel 256 by which the mixed substance is transported along the second stage portion 222 to the screw tip 54. The mixing flight 150 is a serrated single mixing flight 150. The serrated single mixing flight 150 has a constant height and a constant pitch, and are serrated to promote the cross flow of the substance. Thus, the mixing section 236 causes serrated mixing and conveying with friction flow and bypass mixing of the substance such that constant volume flow of the mixed substance is extruded from the screw tip 54.

Generally, the injection molding screw 10, 110, 210 of the present invention has a low compression ratio in comparison to known screws, such as a conventional general purpose plastic or metal injection molding screw, which generally has a compression ratio of 1.5 to 1 to 4.0 to 1, or the known standard screw design for the microcellular process, which generally has a compression ratio of 2.6 to 1. The injection molding screws 10, 110, 210 of the three presently preferred embodiments have compression ratios of about 2.0 to 1, about 1.5 to 1 to about 1.7 to 1, and about 1.5 to 1 to about 1.7 to 1, respectively. A contributing factor to melt pressure decay in tests with MIM feedstocks using the standard screw for the microcellular process is the first stage compression ratio of 2.6 to 1, which is 1 point higher than the MIM industry range of 1.5 to 1 to 1.7 to 1 ratio for general-purpose MIM screws. For mixing and extruding feedstocks having non-polymer binders, the injection molding screw may prefer to have a compression ratio of about 1.2 to 1 to about 1.49 to 1.

Figure 8:
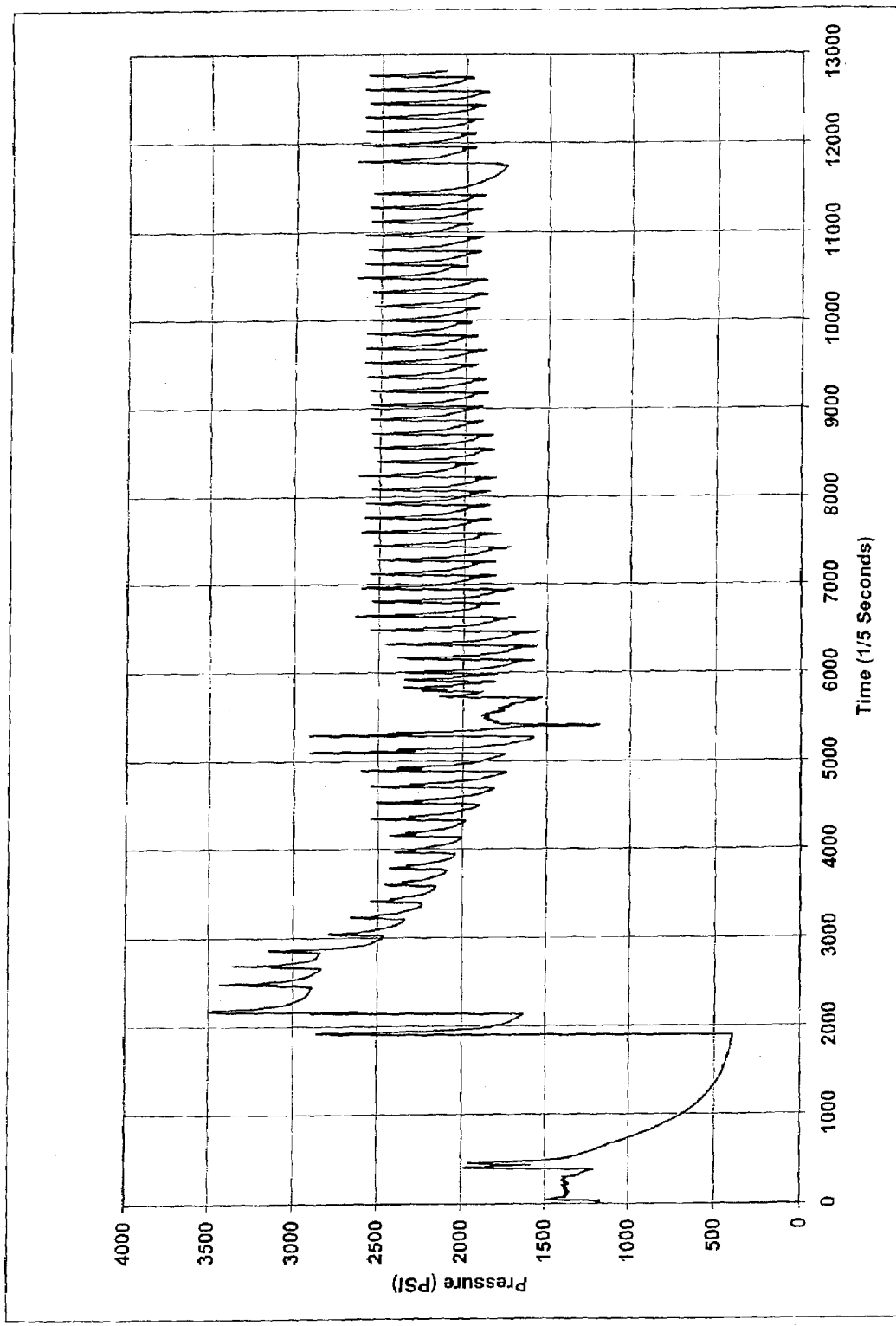
Figure 9:
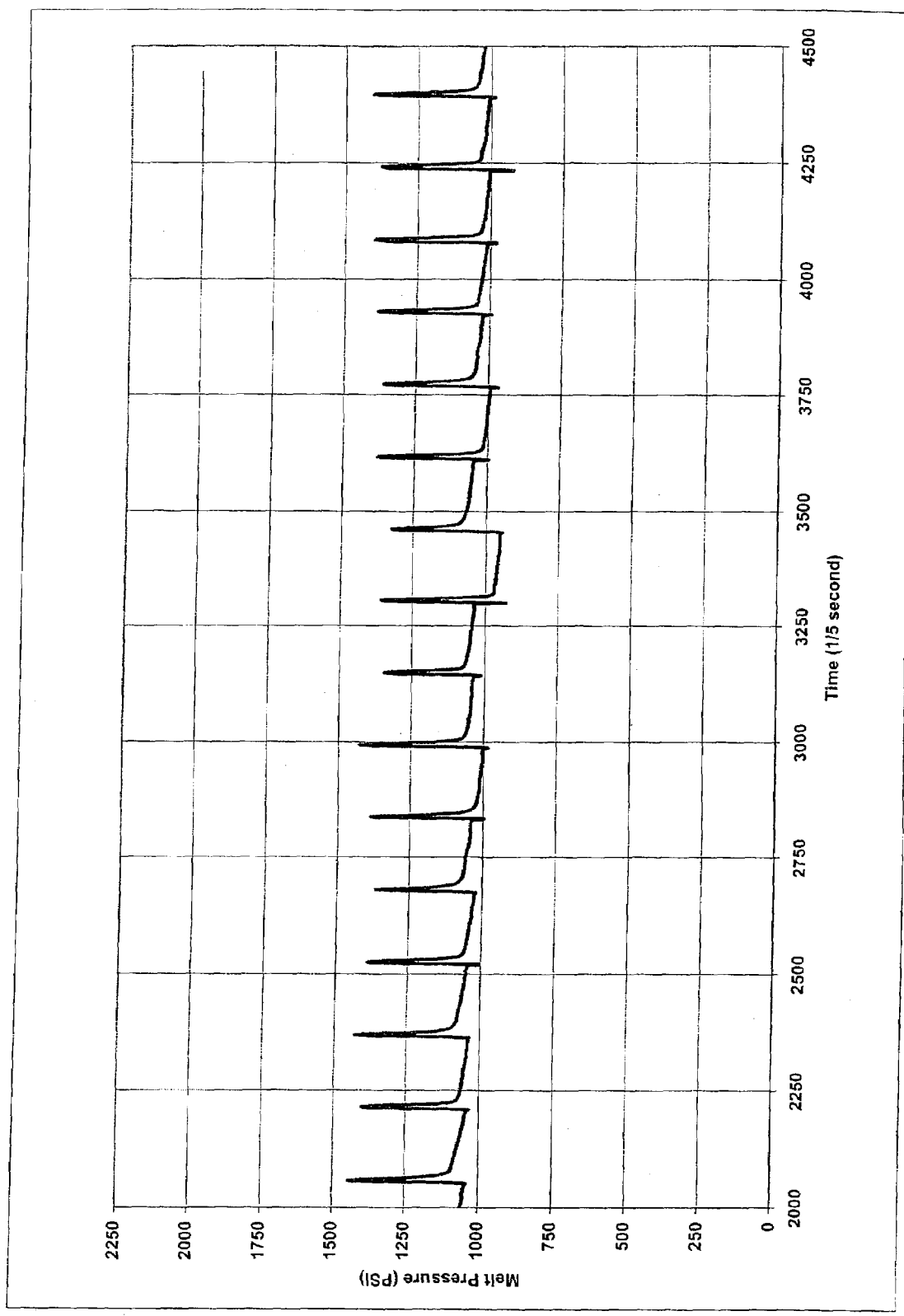
Figure 10:
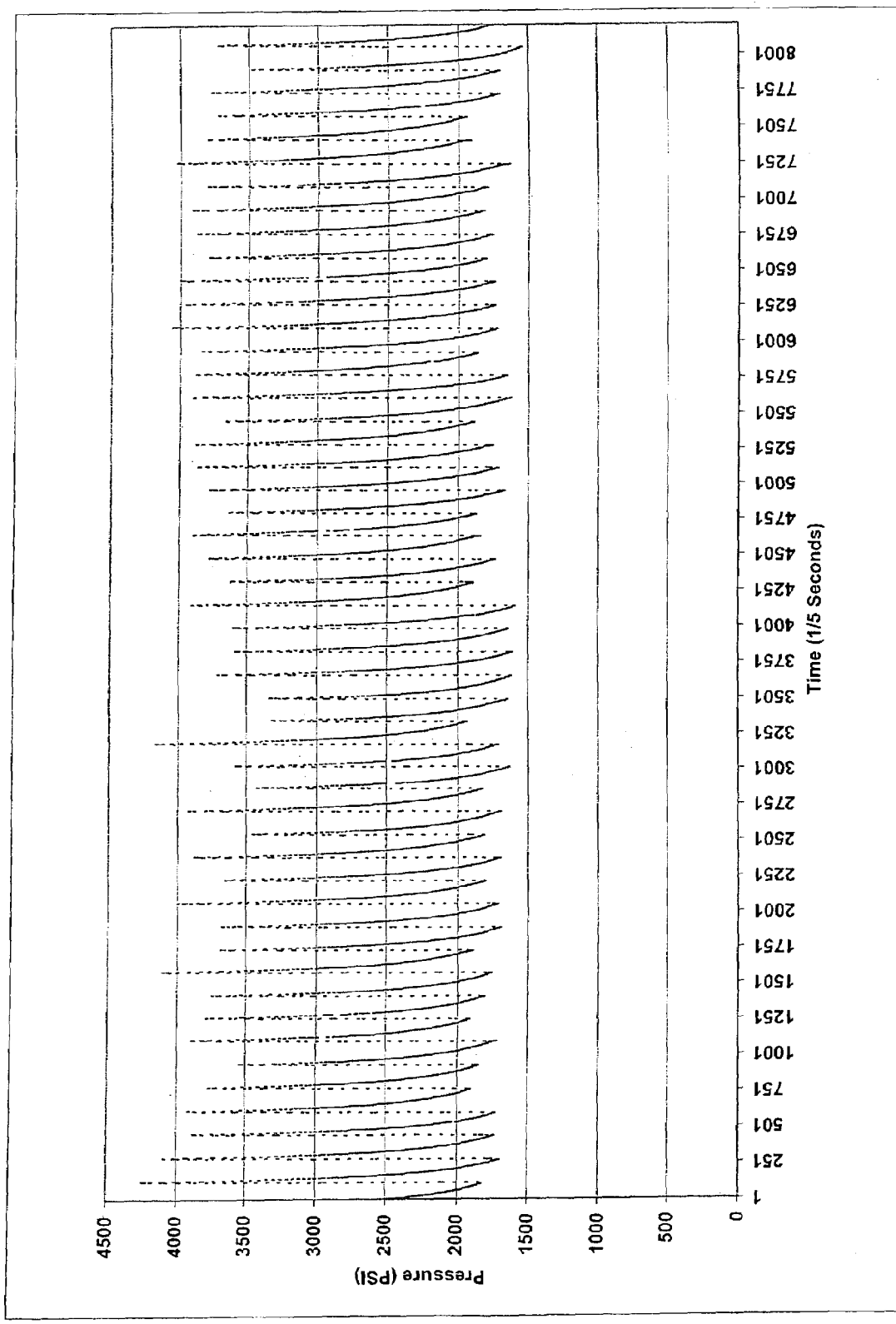

In reference to FIGS. 7–10, these graphs show the effects or results of adding the ring check valve 18 to control the pressure change in the molding process. FIG. 7 provides a comparison between the wiping and mixing (middle) section pressure encountered when employing an MIM injection molding screw according to the present invention and the middle section pressure encountered when employing the standard MuCell process MIM screw. In this case, the feedstock being processed is a PA, 33% GF. FIG. 8 provides the middle section pressure encountered when employing an injection molding screw of the present invention and processing PP feedstock. FIG. 9 provides the middle section pressure encountered when employing an injection molding screw of the present invention and processing PSU feedstock and using gas. FIG. 10 provides the middle section pressure encountered when employing an injection molding screw of the present invention and processing BASF feedstock and using gas.

FIGS. 7–10 show the melt pressure change of each cycle in a continuous fashion. The pressure is measured in the barrel at the location of the SCF gas injection port. The location of the port is critical to the delay, distribution and dispersion of the gas at the optimum pressure differential.

EXAMPLE 1

Figure 7A:
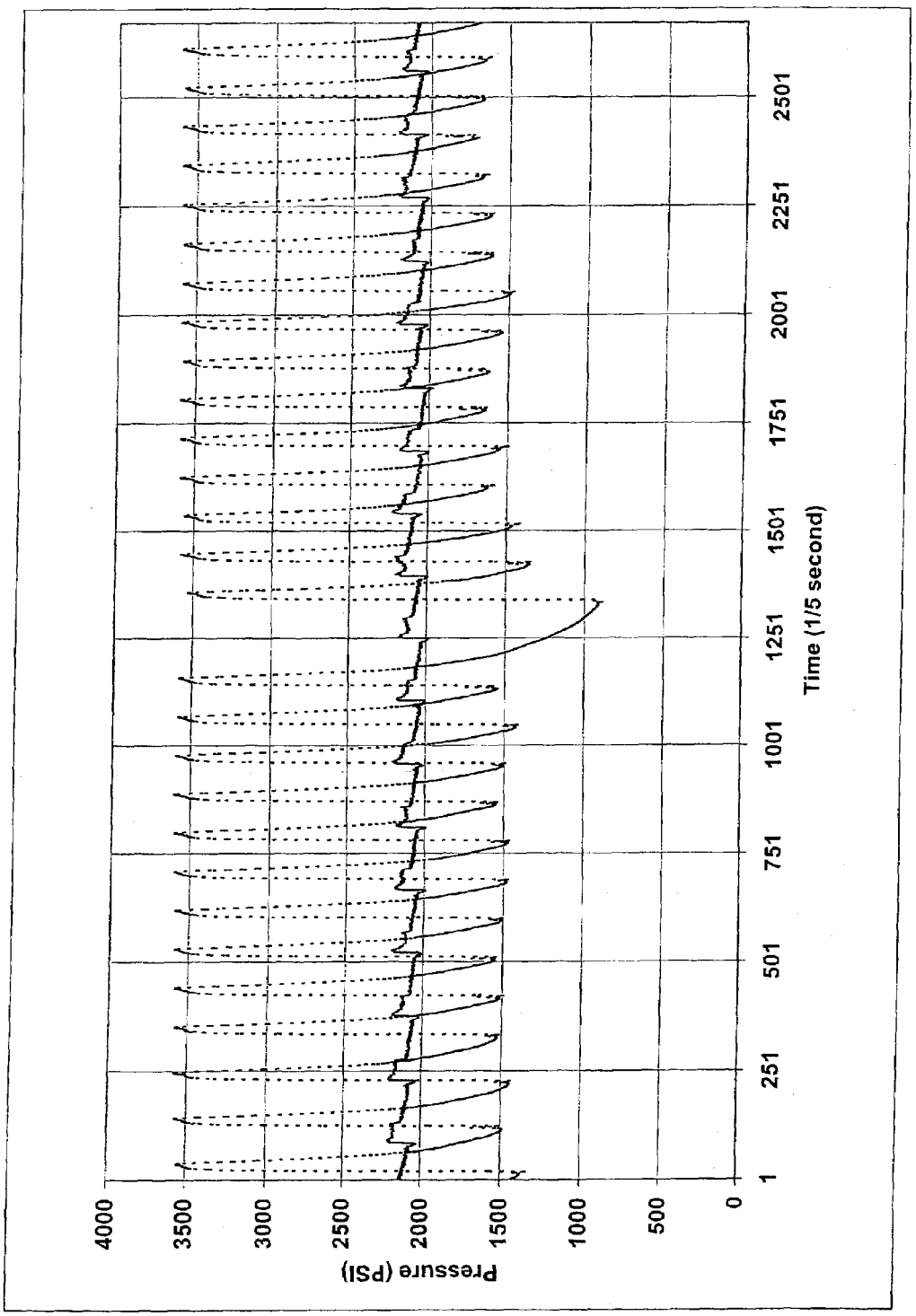

The pressure drop of the molten material in the wiping and mixing section of the standard screw for the microcellular process is shown in FIG. 7 with the pressure variation of 2000 PSI during one molding cycle with the PA material tested. The material processed to produce this graph was a 33% short fiberglass reinforced polyamide 6 (Nylon 6) resin. This material was used in processing of polymer MuCell parts with the standard Trexel MuCell screw, and this material was used as a baseline for the process control improvements with the addition of the middle section check ring when processing MIM feedstock materials. This was done initially with polymer materials in an effort to control development costs, as MIM feedstock materials are costly, and ultimately to provide a timely correlation between the standard Trexel screw and the screw of the present invention. The curve with the large peak and valleys is the standard Trexel screw data. FIG. 7A provides an expanded view of data provided in FIG. 7.

With the same molding machine processing conditions and material, the MP MIM screw 10 (as illustrated in FIG. 1), of the first embodiment, produced a pressure variation of 250 PSI. The reduction in pressure variation enables a wider processing window for the molding cycle that is the main factor to the successful processing of MIM feedstocks in making microporous metals.

EXAMPLE 2

The data provided in FIG. 8 show the performance of the screw of the present invention with processing a general-purpose grade of an unfilled polypropylene material. This polymer material is in the same family of resins as polyethylene and polystyrene (olefins) the ingredients used in the AMP and Penn State MIM feedstock materials that are employed to produce microporous metal material. The goal was to determine the pressure decay from a process start-up to a stable process at the mid-section check ring location. The decay was held to about 600 PSI. The processing conditions are provided in Table A.

TABLE A

| Machine Process Setting | Value | Units | Note: |
| --- | --- | --- | --- |
| Barrel Temperature, Zone #1 | 430 | Fahrenheit | Feedthroat End |
| Barrel Temperature, Zone #2 | 440 | Fahrenheit | |
| Barrel Temperature, Zone #3 | 440 | Fahrenheit | |
| Barrel Temperature, Zone #4 | 440 | Fahrenheit | |
| Shut-off nozzle, Zone #5 | 440 | Fahrenheit | Shut-off nozzle end |
| Screw Stroke | 0.9 | inch | 30 mm screw |
| Screw Recovery Speed | 8.0 | inch/second | circumferential speed |
| Back Pressure | 1,500 | pounds force/inch$^2$ | |
| Injection speed | 1.0 | inch/second | |

TABLE A-continued

| Machine Process Setting | Value | Units | Note: |
|---|---|---|---|
| Injection pressure set point | 13,000 | pounds force/inch$^2$ | |
| Actual Injection Pressure | 8,200 | pounds force/inch$^2$ | Average |
| Injection switch over point | 0.18 | inch | |
| Hold Pressure | 8000 | pounds force/inch$^2$ | |
| Hold Time | 0.2 | seconds | |
| Cycle time | 32.31 | seconds | |
| Cooling time | 20 | seconds | |
| Clamp Tonnage | 50 | US Tons force | Mold closing force on injection cycle |
| Nitrogen gas delivery pressure | 2800 | pounds force/inch$^2$ | |
| Nitrogen gas delivery flow rate | 0.3 | pound mass/hour | |
| Nitrogen gas flow valve open time | 2.0 | seconds | |

EXAMPLE 3

The data in FIG. 9 show the pressure variation in processing at the mid-section check location on the screw of the injection molding screw of the present invention. Solid MIM material formulated by Penn State University is being processed (microporous MIM turned OFF). The MIM feedstock check ring location melt pressure variation drop is in alignment with FIGS. 7 and 7A. However, the pressure rise on screw recovery is a result of the lower viscosity of the MIM feedstock material as compared to the 33% glass filled nylon material in FIGS. 7 and 7A. The decay after screw stoppage was almost liner to the point of injection, indicated with the slight drop in pressure before the screw rotation pressure rise. The lack of the pressure decay after screw stoppage and before injection indicates that the mid-section check ring is functioning with the MIM feedstock material. The processing conditions are provided in Table B.

in FIG. 9 is a result of the MIM feedstock binder viscosity reduction with the addition of the SCF gas, at a higher backpressure and SCF gas delivery pressure. The control of the pressure decay to a minimum level is important to maintaining a stable microporous MIM molding process. The minimum pressure should be sustained above the critical pressure of the SCF gas to maintain a single-phase solution during processing. This graph shows a small pressure rise in injection stroke, just before the sharp pressure rise on the screw rotation cycle (FIG. 10A), followed by a pressure decay to the level just before injection.

Figure 10A:
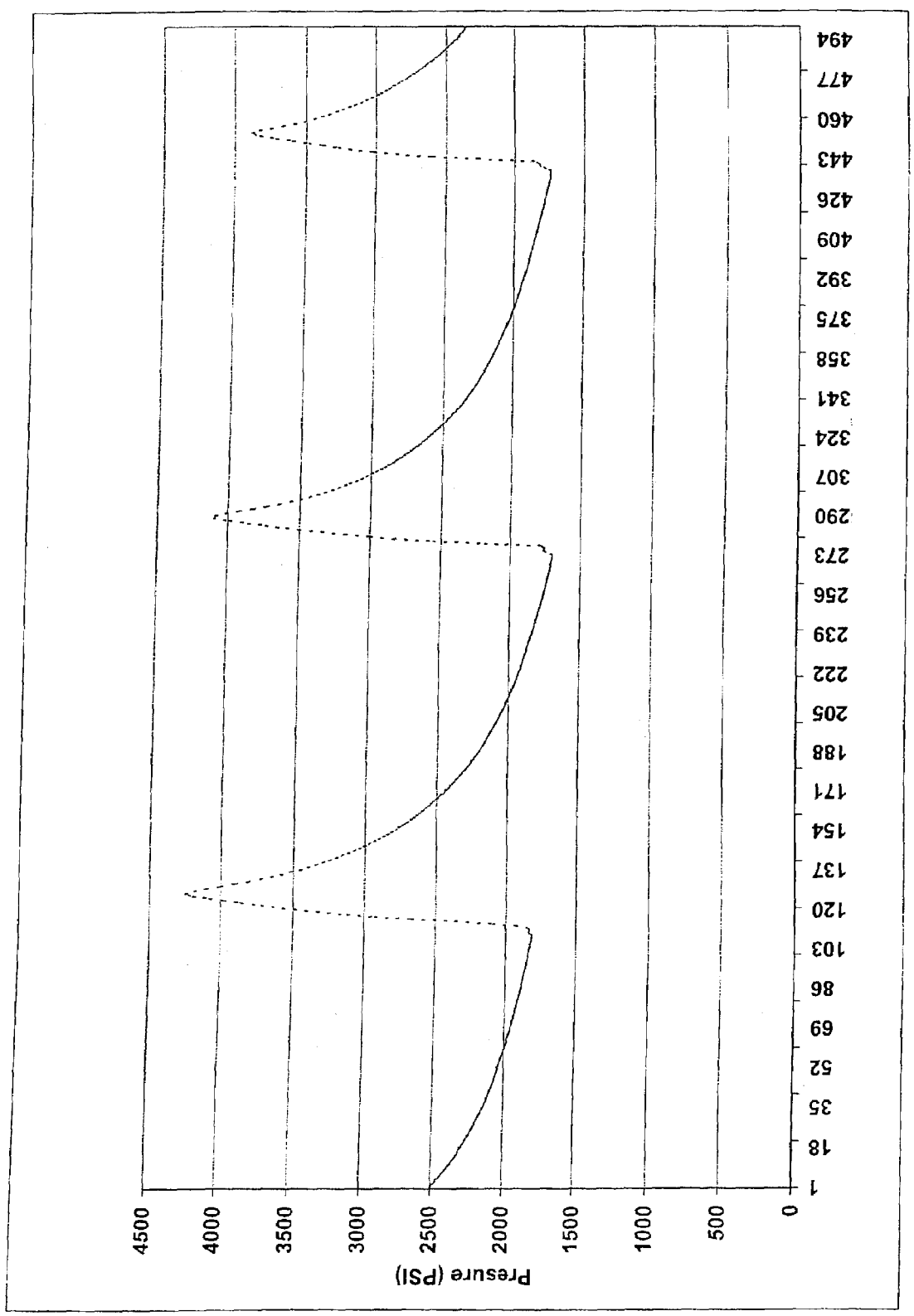
Figure 16B:
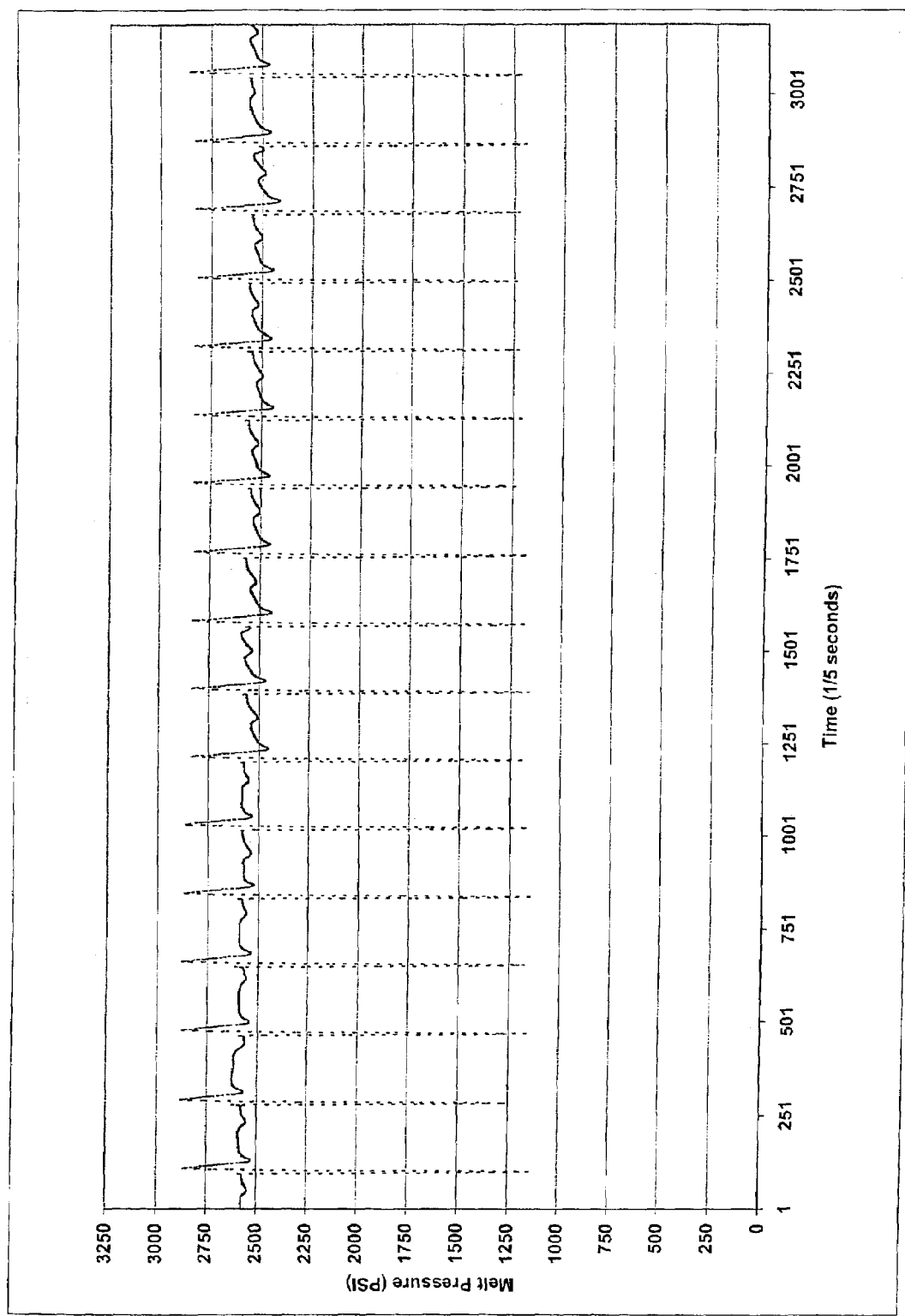

FIG. 10A is a graph depicting 3 injection cycles of FIG. 10.

COMPARATIVE EXAMPLE

The data in FIG. 10B show the performance attained from an extended screw recovery using the standard Trexel Screw.

TABLE B

| Machine Process Setting | Value | Units | Note: |
|---|---|---|---|
| Barrel Temperature #1 | 425 | Fahrenheit | Feedthroat End |
| Barrel Temperature #2 | 470 | Fahrenheit | |
| Barrel Temperature #3 | 460 | Fahrenheit | |
| Barrel Temperature #4 | 460 | Fahrenheit | |
| Shut-off nozzle #5 | 475 | Fahrenheit | Shut-off nozzle |
| Screw Stroke | 0.82 | inch | 30 mm screw |
| Screw Recovery Speed | 7.0 | inch/second | circumferential speed |
| Back Pressure | 1,500 | pounds force/inch$^2$ | |
| Injection speed | 6.2 | inch/second | |
| Injection pressure set point | 20,000 | pounds force/inch$^2$ | |
| Actual Injection Pressure | 17,990 | pounds force/inch$^2$ | Average |
| Injection switch over point | 0.18 | inch | |
| Hold Pressure | 3000 | pounds force/inch$^2$ | |
| Hold Time | 0 | seconds | |
| Cycle time | 32.75 | seconds | |
| Cooling time | 25 | seconds | |
| Clamp Tonnage | 50 | US Tons force | Mold closing force on injection cycle |
| Nitrogen gas delivery pressure | 2800 | pounds force/inch$^2$ | |
| Nitrogen gas delivery flow rate | 0.3 | pound mass/hour | |
| Nitrogen gas flow valve open time | 0.6 | seconds | |

EXAMPLE 4

The data in FIG. 10 show the Penn State University-formulated MIM feedstock material pressure variation in processing at the mid-section check location on the screw with the microporous MIM turned ON. The increase in pressure during screw recovery as compared to solid MIM The pressure drop at injection is an abbreviated decay right before injection and with a slight pressure rise before screw recovery. The first pressure rise between the pressure drops for each cycle is from the addition of the SCF gas at a pressure above the molding machine backpressure setting. This shows that the pressure decay can be held in a consistent process, but is an undesirable attribute because of the significant pressure variation within one process cycle. The processing conditions are given in Table C.

TABLE C

| Machine Process Setting | Value | Units | Note: |
|---|---|---|---|
| Barrel Temperature #1 | 390 | Fahrenheit | Feedthroat End |
| Barrel Temperature #2 | 425 | Fahrenheit | |
| Barrel Temperature #3 | 400 | Fahrenheit | |
| Barrel Temperature #4 | 380 | Fahrenheit | |
| Shut-off nozzle #5 | 425 | Fahrenheit | Shut-off nozzle |
| Screw Stroke | 0.6 | inch | 30 mm screw |
| Screw Recovery Speed | 16.0 | inch/second | circumferential speed |
| Back Pressure | 2,700 | pounds force/inch$^2$ | |
| Injection speed | 2.0 | inch/second | |
| Injection pressure set point | 20,000 | pounds force/inch$^2$ | |
| Actual Injection Pressure | 8,350 | pounds force/inch$^2$ | Average |
| Injection switch over point | 0.15 | inch | |
| Hold Pressure | 4000 | pounds force/inch$^2$ | |
| Hold Time | 3.0 | seconds | |
| Cycle time | 27.91 | seconds | |
| Cooling time | 20 | seconds | |
| Clamp Tonnage | 40 | US Tons force | Mold closing force on injection cycle |
| Carbon Dioxide gas delivery pressure | 3500 | pounds force/inch$^2$ | |
| Carbon Dioxide gas delivery flow rate | 0.3 | pound mass/hour | |
| Carbon Dioxide gas flow valve open time | 0.5 | seconds | |

Figure 5:
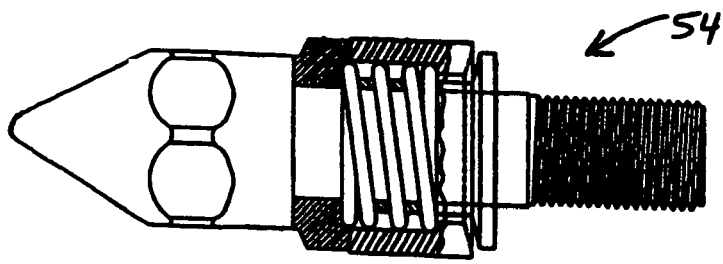
FIG. 5 is a side elevational view of the improved check valve assembly of U.S. Pat. No. 5,441,400, with portions of the check ring broken away and in section.
Figure 6:
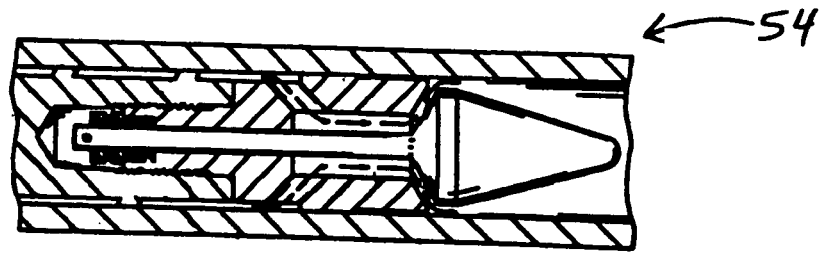
FIG. 6 is a partial cross-sectional view of an extruder injection apparatus of U.S. Pat. No. 5,164,207, showing the automatic shut-off valve in the open position.

The addition of the positive return valve screw tip 54 (as illustrated in FIGS. 4–6) for the MIM feedstock processing prevents injection pressure from packing the feedstock material in the second stage portion 22, 122, 222 that creates an obstruction or restricts the forward flow of material. Also, the positive return valve screw tip 54 reduces the potential that the safety pressure relief valve (not shown; well known in the art), located on the barrel 49 of the molding machine, will fail from injection pressures being realized in the second stage portion 22, 122, 222. In addition, the valve closure improves the part or shot size control by over 50%, because of the elimination of the free sliding valve closure response on the injection stroke.

The benefit to the microporous MIM process using the screw 10, 110, 210, is the ability to control the molten pressure variation in the second stage portion 22, 122, 222 of the screw 10, 110, 210 across a wide range of molten MIM feedstock material melt temperatures and molding machine back pressure settings. The molten material viscosity changes with the temperature setting and directly relates to the pressure drop during one molding cycle. The higher the temperature, the lower the viscosity of the molten MIM feedstock. The MIM feedstocks behave differently than polymer materials because of the higher thermal conductivity of the metallic powder particles and the ratio of the powder and binder materials that make up the feedstock.

The ring check valve 18 controls the back flow of material through the first stage portion 20 to the hopper (not shown; well known in the art) at atmospheric pressure, thus maximizing the pressure drop across the ring check valve 18. The material feed pressure from the first stage portion 20 must overcome the pressure on the second stage portion 20, 120, 220 to enable material flow. The small pressure drop depicted in the MIM screw 10 shown in FIG. 7 is from the clearance between the inner diameter of the barrel 49 and the outer diameter of the ring check valve 18.

The next contributing factor reflected in the results reported in FIGS. 7–10 is the change in the screw geometry of the second stage portion 20, 120, 220 when compared with the standard screw for the microcellular process. By changing the second stage portion 20, 120, 220 to a less restrictive, positive pumping geometry of the microporous MIM screw 10, 110, 210 with the ring check valve 18, higher or lower back pressures can now be used because of the lower restriction to material conveying compared to the standard screw for the microcellular process when processing MIM feedstock material. However, it is well known in the art that there are many different screw mixing and conveying geometries that will satisfy this requirement.

In use, the injection molding screw 10, 110, 210 of the present invention is inserted into an extrusion barrel, such as the barrel 49, and is operably attached or engaged, at its drive end 12, to a drive means, and, at its screw tip receiving end 14, to a screw tip 54. Alternatively, the injection molding screw 10, 110, 210 of the present invention can be inserted into an extrusion barrel that is a part of a processing system (not shown; well known in the art), and then is operably attached or engaged, at its drive end 12, to a drive means, and, at its screw tip receiving end 14, to a screw tip 54. It is well known in the art that a processing system can comprise at least one temperature control unit, at least one hopper, at least one device for metering the fluid, at least one melt pressure transducer, and other elements, units, devices, or systems. After attachment or engagement to the drive means and screw tip 54, the screw 10, 110, 210 can be operated. Also, it can be important to keep a pressure head (not shown; well known in the art) on the molten material or substance to prevent the formation of gas pockets in the material downstream of the check valve 18.

As an example of usage of the present invention in a processing system (not shown; well known in the art), it is preferred that a molding machine nozzle well known in the art) incorporate a shut-off valve (not shown; well known in the art) to contain the pressure in the barrel downstream from the gas port and check valve or pressure restriction element on the screw. This valve is either spring loaded and pressure activated, or pneumatic or hydraulic actuated internal or external needle type. These are commercially available from Herzog USA, Xaloy and OEM molding machine manufacturers.

An example of an external type is made by Arburg, which is a mechanical connection to a hydraulic cylinder to open and close with hydraulic pressure, or spring loaded to open, hydraulic to close. The external needle design by Arburg is the preferred method to working with the microporous metals because of the positive controlled function to open or close the needle. This is important when adding SCF or blowing agent to the molten feedstock which tends to pass powder particles into the clearance area surrounding the shut-off needle. The tendency is for certain particle sizes to cause adhesive wear and welding of the particles to the shut-off pin or the inner diameter of the pinhole in the nozzle.

The internal needle types are typically molten material pressure activated and either spring loaded or mechanically closed with hydraulic or pneumatic pressure. This design has several passages for the molten material to pass in the nozzle and from the shear and flow characteristics; if properly designed, the powder binder can separate and potentially cause an obstruction in the nozzle.

Another reason to use the internal needle type over the external needle type is the ability to change the nozzle orifice size to enable more flexibility in the processing of the microporous metals by tailoring the material flow rate and pressure drop during the injection cycle. This is the only limitation to the external needle type shut-off nozzles. The external shut-off needle nozzle would require a unique nozzle design for each nozzle orifice size required to optimize the microporous metal process. This would be magnified with larger part shot sizes requiring a large volume flow of material to fill the mold to have the pressure drop required to form the microporous structure in the mold.

For generating microporous metals, using this optimized screw design for microporous metals, it is preferred that the molding machine barrel 49 have a positive shut-off nozzle 15 (FIG. 1). To make the microporous metals process more robustly, the nozzle should be of the external needle type to ensure the opening and closing of the valve is a positive movement.

The injection molding screw 10, 110, 210 of the present invention may be manufactured as a one-piece screw or a multiple-piece screw, such as a two-piece screw.

The injection molding screw 10, 110, 210, including the pressure retention element 18 and possibly including a positive shut-off screw tip, of the present invention is a preferred device for generating microporus metals. The benefits derived from this preferred device could also be obtained for applications pertaining to polymer materials and the control of the microcellular polymer processing.

It is to be understood that the invention is not limited to the preferred embodiments described herein, but encompasses all embodiments within the scope of the following claims.

What is claimed is:

1. In combination:
    (a) an injection molding screw barrel including:
        (1) at least one gas injection port; and
        (2) a nozzle including a shut-off valve; and
    (b) an injection molding screw in the barrel, the injection molding screw comprising:
    a first end adapted for engagement with drive means;
    a second end adapted for engagement with a screw tip;
    a longitudinal body extending axially along a length of said screw between said first end and said second end, said body comprising a first stage portion and a second stage portion,
    said first stage portion being adapted for first receiving at least one substance and for transporting the at least one substance to said second stage portion, said first stage portion including at least one flight extending helically along said first stage portion, said at least one flight forming at least one channel through which the at least one substance is transported along said first stage portion to said second stage portion,
    said second stage portion including at least one mixing section, and being adapted for transporting the at least one substance transported from said first stage portion to the screw tip, said at least one mixing section being adapted for mixing the at least one substance transported from said first stage portion and for transporting the at least one substance that has been mixed to the screw tip for extrusion wherein at least one fluid is introduced to the at least one substance transported from said first stage portion by at least one injection port of a processing system; and
    a pressure retention element adapted for being positioned between said first stage portion and said second stage portion for reducing loss of pressure in said second stage portion;
    wherein said at least one gas injection port is positioned proximate said second stage portion of said screw.

2. The combination according to claim 1, wherein said first stage portion of said body comprises a plurality of sections.

3. The combination according to claim 2, wherein said plurality of sections of said first stage portion includes a feed section, a transition section, and a metering section, said feed section is located most proximate to said first end, said transition section is located intermediate said feed section and said metering section, each of said feed section, said transition section, and said metering section has a minor diameter.

4. The combination according to claim 3, wherein said minor diameter of said metering section is greater than said minor diameter of said transition section and said minor diameter of said transition section is greater than said minor diameter of said feed section.

5. The combination according to claim 3, wherein said minor diameter of said metering section is about the same as a minor diameter of said mixing section.

6. The combination according to claim 3, wherein each of said minor diameter of said metering section and a minor diameter of said mixing section is greater than a minor diameter of an intermediate section located between said first stage portion and said second stage portion.

7. The combination according to claim 1, wherein said second stage portion includes at least one mixing flight extending helically along said second stage portion, said at least one mixing flight forms at least one channel through which the at least one substance that has been mixed is transported along said second stage portion to the screw tip.

8. The combination according to claim 7, wherein said at least one mixing flight is a serrated double mixing flight.

9. The combination according to claim 8, wherein said serrated double mixing flight has a pitch of one-half.

10. The combination according to claim 7, wherein said at least one mixing flight is a serrated single mixing flight.

11. The combination according to claim 7, wherein said at least one mixing flight is a constant pitch single mixing flight.

12. The combination according to claim 1, wherein one mixing section of said at least one mixing section is located most proximate to said second end.

13. The combination according to claim 1, wherein said longitudinal body is generally cylindrical.

14. The combination according to claim 1, further comprising a screw tip.

15. The combination according to claim 14, wherein said screw tip is an automatic closure screw tip.

16. The combination according to claim 1, wherein said second end includes a screw tip channel dimensioned and configured for receiving an engagement end of the screw tip.

17. The combination according to claim 1, wherein said second stage portion further includes a helical wiping section located between said at least one mixing section and an intermediate section located between said first stage portion and said second stage portion.

18. The combination according to claim 1, wherein said screw has a compression ratio of about 2.0 to 1.

19. The combination according to claim 1, wherein said screw has a compression ratio of about 1.5 to 1 to about 1.7 to 1.

20. The combination according to claim 1, wherein said screw has a compression ratio of about 1.2 to 1 to about 1.49 to 1 for mixing and extruding feedstocks having non-polymer binders.

21. The combination according to claim 1, wherein the processing system comprises at least a barrel having an upstream direction and a downstream direction.

22. The combination according to claim 21, wherein said pressure retention element, when in use, is positioned upstream of the location of the gas injection port on the barrel.

23. The combination according to claim 1, wherein said pressure retention element is constructed and arranged to restrict the upstream flow of the at least one substance therethrough during at least a portion of an injection or ejection cycle, to maintain the at least one substance downstream of said pressure retention element at a pressure of at least 1000 psi throughout the injection or ejection cycle.

24. The combination according to claim 1, wherein said pressure retention element is constructed and arranged to restrict the upstream flow of the at least one substance therethrough during at least a portion of an injection or ejection cycle, to maintain the at least one substance downstream of said pressure retention element at a pressure of at least 2000 psi throughout the injection or ejection cycle.

25. The combination according to claim 1, wherein said pressure retention element is constructed and arranged to restrict the upstream flow of the at least one substance therethrough during at least a portion of an injection or ejection cycle, to maintain the at least one substance downstream of said pressure retention element at a pressure of at least 3000 psi throughout the injection or ejection cycle.

26. The combination according to claim 1, wherein said pressure retention element is constructed and arranged to restrict the upstream flow of the at least one substance therethrough during at least a portion of an injection or ejection cycle to maintain the at least one substance downstream of said pressure retention element at a pressure of at least the critical pressure required for the maintenance of a single-phase solution of the at least one substance and the at least one fluid throughout the injection or ejection cycle.

27. The combination according to claim 1, wherein said injection molding screw reciprocates between an accumulation position and an injection position during the injection or ejection cycle.

28. The combination according to claim 1, wherein said pressure retention element is constructed and arranged to restrict the upstream flow of the at least one substance therethrough when the pressure of the at least one substance downstream of said pressure retention element exceeds the pressure of the at least one substance upstream of said pressure retention element.

29. The combination according to claim 1, wherein said pressure retention element is constructed and arranged to substantially prevent the upstream flow of the at least one substance during at least a portion of the injection or ejection cycle.

30. The combination according to claim 1, wherein said pressure retention element comprises a valve constructed and arranged to permit downstream flow of the at least one substance therethrough in a first position and to restrict upstream flow of the at least one substance therethrough in a second position.

31. The combination according to claim 30, wherein said valve is constructed and arranged to move from the first position to the second position when the pressure of the at least one substance downstream of said valve exceeds the pressure of the at least one substance upstream of said valve.

32. The combination according to claim 30, wherein said valve includes a spring element, said spring element is biased to urge said valve from the first position to the second position.

33. The combination according to claim 30, wherein said valve is constructed and arranged to substantially prevent upstream flow of the at least one substance therethrough in the second position.

34. The combination according to claim 30, wherein said valve is constructed and arranged to permit limited upstream flow of the at least one substance therethrough during a time period when said valve moves from the first position to the second position.

35. The combination according to claim 30, wherein said injection molding screw reciprocates between an accumulation position and an injection position and said valve is in the second position for at least a portion of the time when said injection molding screw is in the injection position.

36. The combination according to claim 30, wherein said valve is in the second position for at least a portion of the time when said injection molding screw is idle.

37. The combination according to claim 30, wherein said valve comprises a ring check valve.

38. The combination according to claim 37, wherein said ring check valve comprises a sealing surface and a ring, said ring is moveable between a first position of disengagement with said sealing surface thereby permitting the at least one substance to flow therethrough, and a second position of engagement with said sealing surface thereby preventing the upstream flow of the at least one substance therethrough.

39. The combination according to claim 38, wherein said sealing surface comprises at least a portion of said injection molding screw.

40. The combination of claim 1 wherein the shut-off valve is hydraulically actuated and includes an external needle.

41. The combination of claim 1 wherein the shut-off valve is spring-loaded and pressure actuated.

* * * * *